US006722248B1

(12) United States Patent
Johnston, Sr.

(10) Patent No.: US 6,722,248 B1
(45) Date of Patent: Apr. 20, 2004

(54) BI-DIRECTIONAL CUTTING BAND MILL

(76) Inventor: Dwight H. Johnston, Sr., 10802 42nd St., Cattaraugus, NY (US) 14719-9692

(*) Notice: Subject to any disclaimer, the term of this patent is extended or adjusted under 35 U.S.C. 154(b) by 0 days.

(21) Appl. No.: 10/365,292

(22) Filed: Feb. 12, 2003

(51) Int. Cl.[7] .......................... B27B 15/02; B23D 55/00
(52) U.S. Cl. ............................ 83/795; 83/808; 83/813; 144/378; 30/380
(58) Field of Search .......................... 83/934, 808, 809, 83/56, 75.5, 155, 792, 794–797, 803, 810, 811, 813, 816, 522, 574, 613, 636, 745, 798, 34, 35, 36, 400, 76.5; 125/21; 30/380, 372; 144/312, 326 R, 376–378, 3.1

(56) References Cited

U.S. PATENT DOCUMENTS

| | | | | | |
|---|---|---|---|---|---|
| 357,681 | A | | 2/1887 | Maxwell | |
| 448,659 | A | | 3/1891 | Markham | |
| 3,318,347 | A | * | 5/1967 | Alich | 83/74 |
| 3,780,609 | A | | 12/1973 | Storti | 83/420 |
| 4,111,085 | A | * | 9/1978 | Johnson | 83/871 |
| 4,132,253 | A | * | 1/1979 | Mills | 144/136.6 |
| 4,245,535 | A | | 1/1981 | Lockwood et al. | 83/798 |
| 4,270,423 | A | * | 6/1981 | Angelo | 83/102.1 |
| 4,487,097 | A | * | 12/1984 | Hara et al. | 83/56 |
| 4,519,283 | A | | 5/1985 | Sanborn | 83/104 |
| 4,559,858 | A | | 12/1985 | Laskowski et al. | 83/801 |
| 4,660,454 | A | * | 4/1987 | Elsey | 83/797 |
| 4,697,487 | A | * | 10/1987 | Cameron | 83/708 |
| 4,712,596 | A | * | 12/1987 | McClaran | 144/3.1 |
| 4,823,664 | A | * | 4/1989 | Cooper et al. | 83/367 |
| 4,841,639 | A | * | 6/1989 | Graney | 30/380 |
| 4,854,208 | A | | 8/1989 | Aoyagi | 83/862 |
| 4,893,533 | A | | 1/1990 | Harris | 83/13 |
| 5,107,738 | A | | 4/1992 | Aoyagi | 83/820 |
| 5,213,022 | A | | 5/1993 | Elgan | 83/797 |
| 5,305,673 | A | | 4/1994 | Costley | 83/802 |
| 5,410,934 | A | | 5/1995 | Krippelz | 83/820 |
| 5,784,941 | A | | 7/1998 | Sanborn | 83/794 |
| 5,819,613 | A | * | 10/1998 | Wilson et al. | 83/13 |
| 6,038,954 | A | | 3/2000 | Keener | 83/795 |
| 6,161,603 | A | * | 12/2000 | Rautio | 144/357 |
| 2002/0152861 | A1 | * | 10/2002 | Conry | 83/56 |
| 2003/0024371 | A1 | * | 2/2003 | Gibson et al. | 83/795 |

* cited by examiner

*Primary Examiner*—Allan N. Shoap
*Assistant Examiner*—Ghassem Alie
(74) *Attorney, Agent, or Firm*—Wayne L. Lovercheck

(57) ABSTRACT

A bi-directional cutting band mill apparatus utilizes two band saws mounted on a carriage for cutting horizontal sections from logs through successive back and forth passes across each log as the carriage reciprocates on a lower frame wherein a section of the log is cut with one band saw in one pass and then a next section of the lumber is cut by the other band saw as the carriage travels in the opposite direction in the following pass. The bi-directional cutting band mill apparatus includes structural elements that allow for the coincident raising and lowering of both band saws and structural elements that provide for the sequential and incremental adjustment of each band saw preparatory for cutting the sections from the log so that each respective band saw can be positioned for making the appropriate depth of cut through the section of the log during that respective pass of the respective band saw.

21 Claims, 9 Drawing Sheets

BI-DIRECTIONAL CUTTING BAND MILL

FIELD OF THE INVENTION

The present invention pertains to timber and log cutting devices, and, more particularly, pertains to a device having two adjustable cutting blades mounted on a traveling carriage for cutting horizontal sections from logs in successive back and forth passes.

BACKGROUND OF THE INVENTION

The transformation of logs and raw timber into lumber, and thence into wood products that range from baseball bats and boxes, furniture and flooring, pencils, baskets, crates and pallets, comprises a number of steps from forest to sawmill and from sawmill to lumberyard, and thence to the manufacturing, chemical or paper plant or factory.

Even with modern equipment and machinery one of the most difficult steps in the logging process involves the transportation of the felled trees (logs) from the forest or woods to the sawmill. The lumbermen generally must skid the logs from the site where they have been cut to a landing (a central location in the woods or forest) for transportation to a sawmill usually by securing the logs to a log skidder that conveys the logs to the landing. The logs can also be placed on sleds, with the sleds then being attached to the log skidders for transport to the landing and thence to the sawmill. This necessitates the cutting of trails or roads through the woods or forest for connecting the logging site to the landing. Additional trails or roads may need to be cut for connecting the landing to a highway if the logs are of sufficient length and diameter that they require transport to the sawmill by a heavy duty log carrying tractor trailer.

In view of the above, it is advantageous to cut the logs into manageable pieces of lumber either on site or at the landing in order to facilitate the removal of the logs from the forest. However, this requires that some type of cutting or sawing unit, such as a band saw, be available for transport to the logging site or landing for performing the requisite log cutting. Thus, the cutting or sawing unit should be portable as logging sites are often located in rugged terrain and remote areas. Such a cutting or sawing unit should also be adaptable for use at smaller sites such as wood lots that are usually located on a portion of a tract of farmland. The size of the cutting or sawing unit should preferably be such as to minimally disturb or disrupt the tract of farmland as the unit is being taken to the site for log cutting and removal therefrom when the log cutting is completed.

SUMMARY OF THE INVENTION

The present invention comprehends a bi-directional cutting band mill utilizing two saw blades for cutting sections from a log by consecutive reciprocable passes of the saw blades.

The band mill of the present invention includes a lower frame or spaced-apart guide rails for placement on the ground or that are part of a wheelable trailer assembly. Supported on the lower frame for reciprocable movement thereon is a carriage or framework. In the preferred embodiment the carriage moves over the log during the successive cutting operations on the log. The carriage includes stanchion members that ride upon the lower frame and that are interconnected by cross members that support thereon the main saw blade motor and other structural elements that cooperate to raise, lower, and adjust both saw blades.

Mounted to the stanchion members and spanning the lower frame is a pair of spaced-apart band saws with the teeth of each band saw generally facing inward toward each other. The band saws are driven by the main saw drive motor and an interconnected pulley and belt system including a drive pulley and main drive belt and ancillary band saw belts and pulleys.

The band saws are capable of being simultaneously raised and lowered as a unit so that they can be lifted completely above the log, and the band saws are also capable of selective incremental adjustment for cutting through the log at the desired depth. In order to simultaneously lift both band saws the band saws are interconnected to each other by a pair of lift bars. Each lift bar is pivotally mounted to a guide, and each guide is slidably mounted to the stanchion members so that when both guides slide upward on the respective stanchion members by a lift motor and chain arrangement, the coincident raising of both band saws occurs and when the guides slide downward on the respective stanchion members the coincident lowering of both band saws results.

In addition, the band saws are capable of individual selective incremental adjustment to obtain the desired depth of cut through the log. A manually operable rack and pinion arrangement permits the operator to position in turn each band saw adjacent the end of the log for the desired depth of cut while simultaneously lifting the other band saw above the log so the cut can be made. As successive sections of the log are cut one band saw is utilized for the cutting while the other band saw is positioned above the log and passes over the log. After the cut is completed the positions of the band saws are changed for the next pass, in the reverse direction, by the band saws for making the next cut.

It is an object of the present invention to provide a band mill that employs two band saws for cutting logs in both directions of travel in order to reduce unnecessary cutting motion and increase productivity in cutting successive sections of the log.

It is another object of the present invention to provide a band mill capable of cutting logs in back and forth passes that utilizes the less expensive type of band saw that has teeth on only one side as opposed to the more expensive saw blades that have teeth on both sides.

It is still another object of the present invention to provide a band mill for bi-directional cutting wherein one saw blade is turned inside out prior to mounting on the carriage so that the teeth on both band saws are on opposite sides thus allowing the band mill to cut logs in both directions of travel.

Yet another object of the present invention is to provide a band mill wherein the sawdust produced during the back and forth cutting movements is discharged in the same direction by both blades.

Yet still another object of the present invention is to provide a band mill that uses the same power source and drive elements for making log cuts in both directions of travel of the carriage and the band saws.

These and other objects, features, and advantages will become apparent upon a perusal of the following detailed description read in conjunction with the accompanying drawings.

DETAILED DESCRIPTION OF THE PREFERRED EMBODIMENT

Illustrated in FIGS. 1 through 9 is saw mill apparatus 10 for cutting logs 12 into manageable and transportable sections or pieces of lumber for further processing at a sawmill. Apparatus 10 generally cuts logs 12 horizontally and lengthwise by reciprocating, back and forth passes across and over the stationary log 12; however, while it is possible for log 12 to be conveyed into apparatus 10 for cutting, the preferred manner of cutting is for log 12 to remain stationary as apparatus 10 passes across log 12 in continuous back and forth movements.

Figure 1:
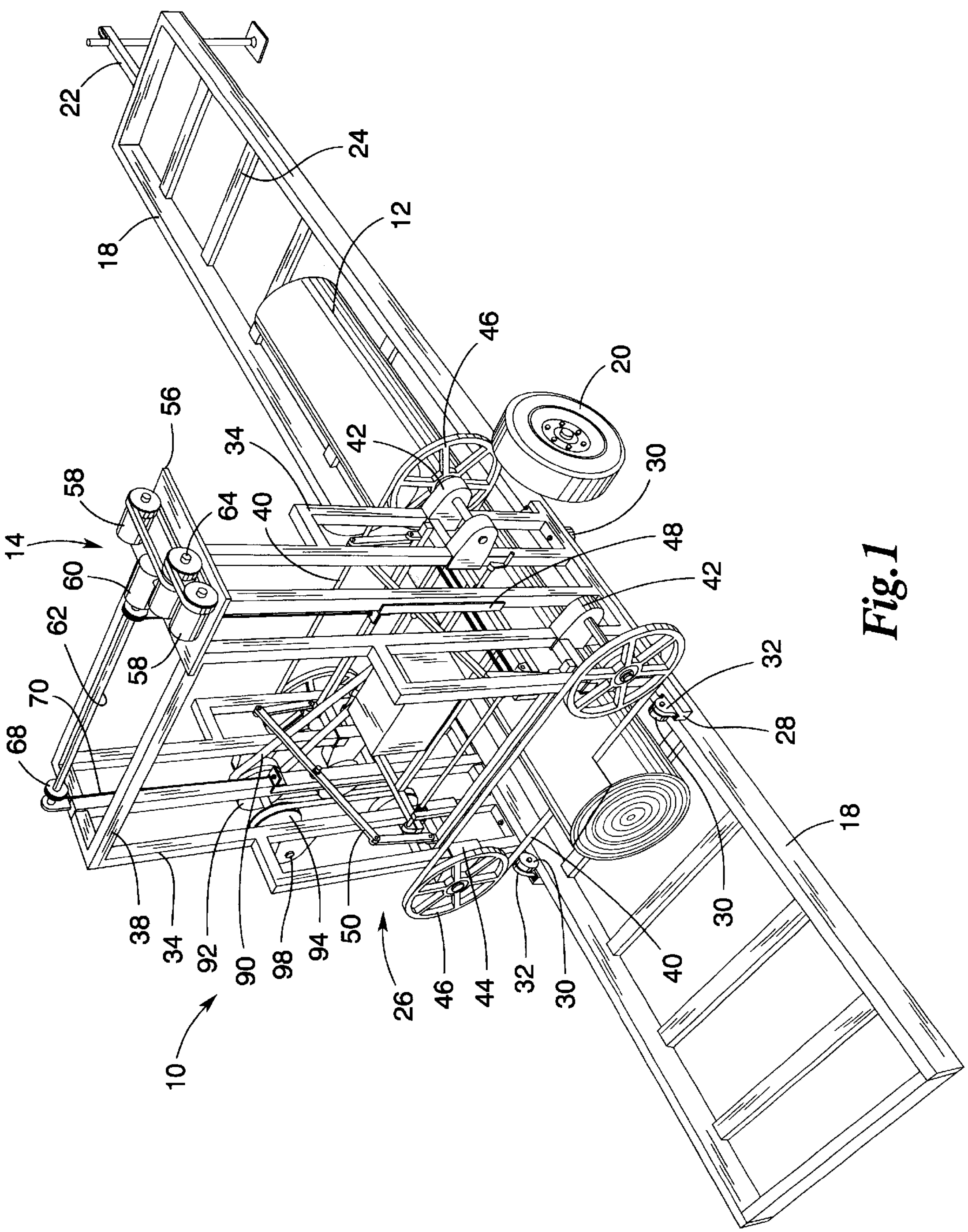
FIG. 1 is a perspective view of the bi-directional cutting band mill unit of the present invention showing the band mill unit mounted on a portable trailer frame.
Figure 2:
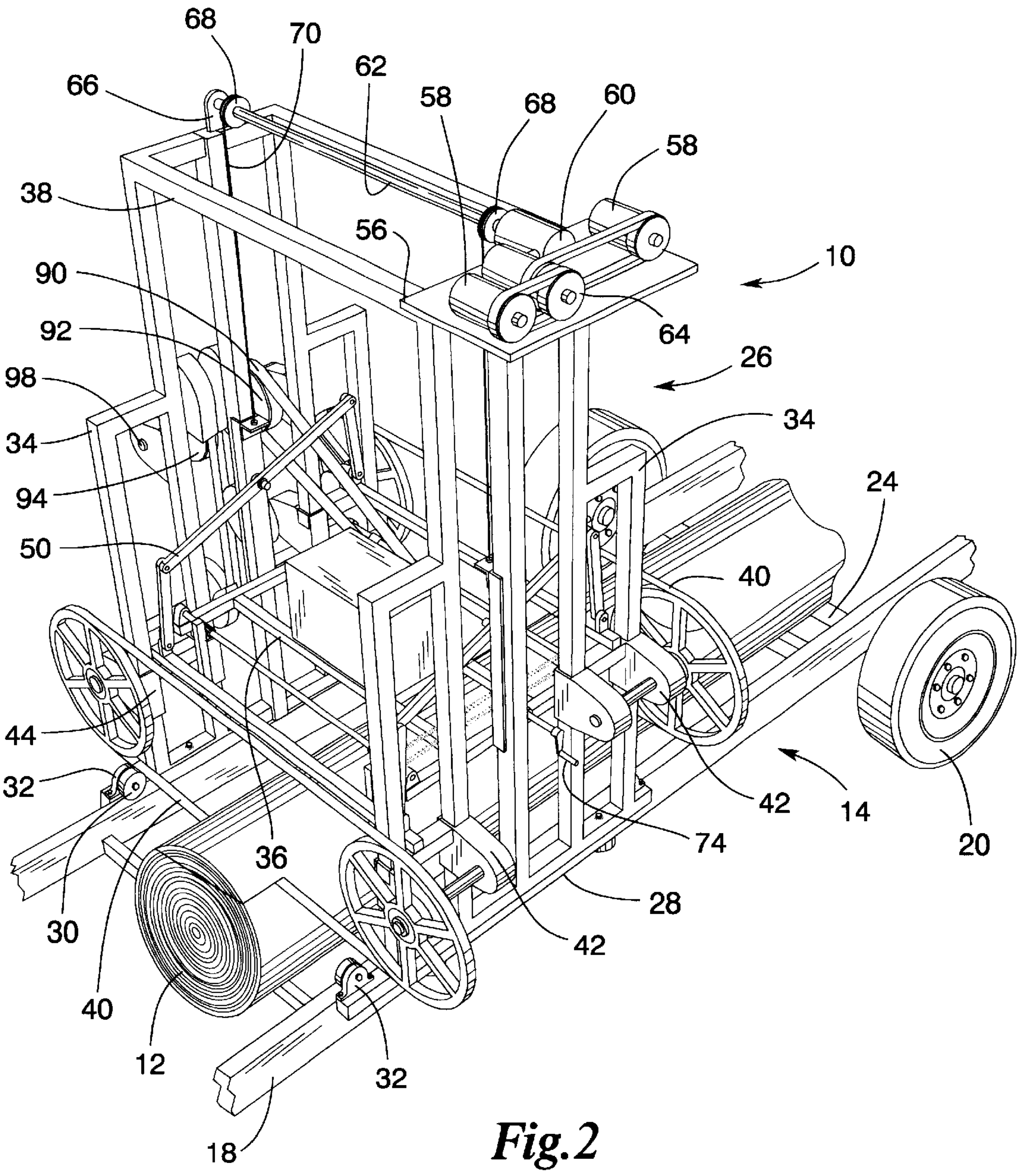
FIG. 2 is a perspective view of the bi-directional cutting band mill unit mounted on the trailer frame and in the process of making a pass across a log for cutting a first section from the log.
Figure 3:
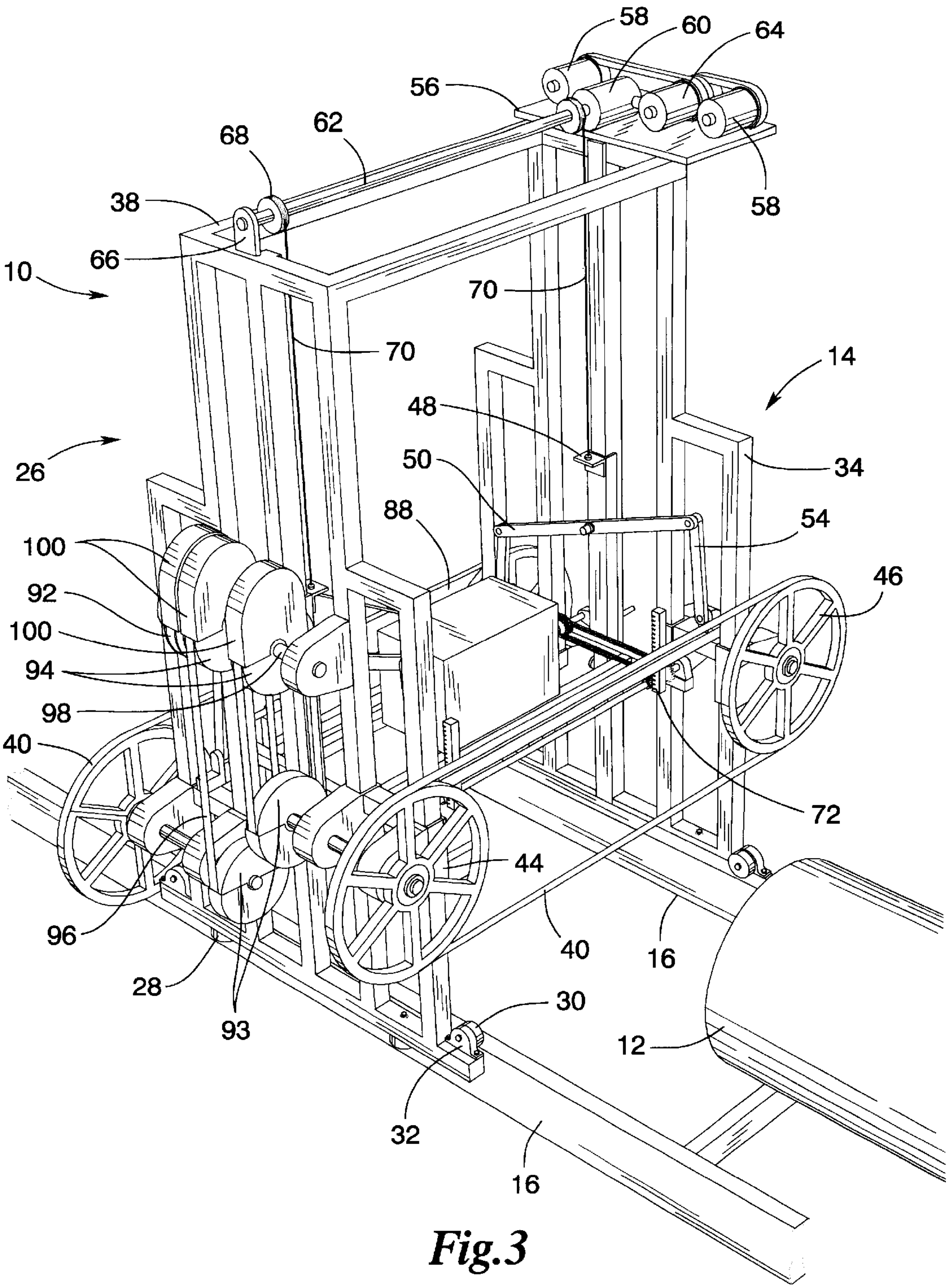
FIG. 3 is a perspective view of the bi-directional cutting band mill unit illustrating one band saw frame and band saw in the raised disposition and one band saw frame and band saw in the lowered disposition.
Figure 9:
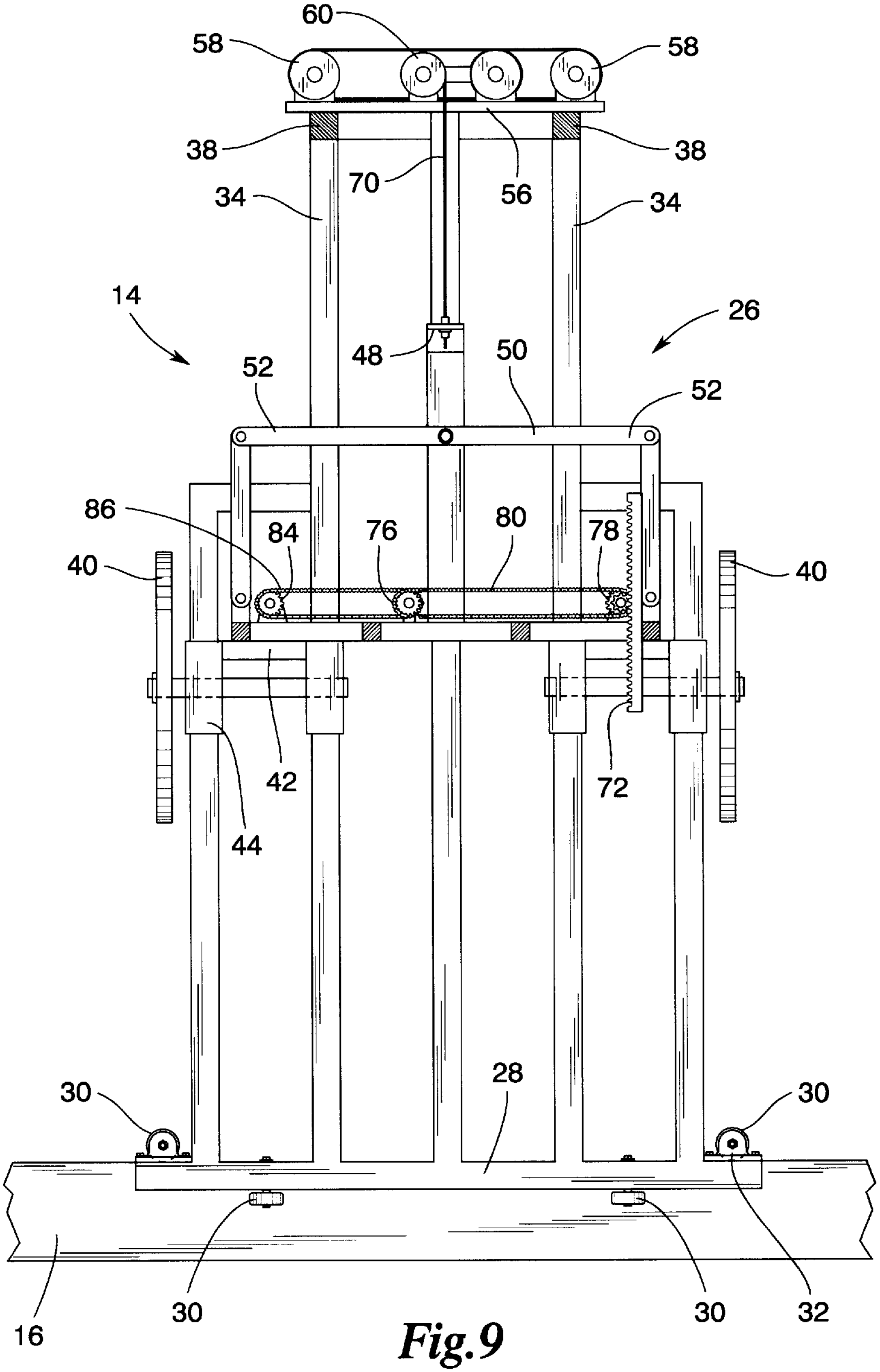
FIG. 9 is a sectioned elevational view of the bi-directional cutting band mill unit taken along lines V—V of FIG. 4 illustrating both band saw frames and band saws in the fully raised disposition and the interaction of the bearings with the lower frame members.

As shown in FIGS. 1 through 9 apparatus 10 of the present invention includes a band mill cutting unit or machine 14 for cutting sections from log 12. Band mill cutting machine 14 can rest upon the ground surface by the use of a lower frame that includes at least two elongated, spaced-apart guide rails or lower frame members 16, as shown in FIGS. 2, 3 and 9. Band mill cutting machine 14 can also be utilized as a portable cutting unit mounted on trailer frame 18 that includes wheels 20 and trailer hitch 22 for allowing band mill unit 14 to be towed and transported to various timber sites by logging trucks and other vehicles. Trailer frame 18 can also include cross members 24 for supporting log 12 thereon during cutting.

With reference to FIGS. 1 through 9, band mill cutting unit 10 includes a movable carriage or framework 26 that rides upon the lower frame members or guide rails 16 in a linear, back and forth or reciprocable motion and can be actuated for movement thereon by any of a variety of mechanical, electromechanical, hydraulic, and pneumatic means conventional and well known in the field. Carriage 26 includes at least two spaced-apart lower carriage members 28 that travel or ride on or against guide rails 16 and essentially maintain the alignment of carriage 26 on guide rails 16. A series of bearings 30 journaled and mounted in bearing frames or supports 32 are used to facilitate the reciprocable motion of carriage 26 on guide rails 16. Attached to and extending upwardly from each lower carriage member 28 are a plurality of stanchion members 34 that can be tubing, bars or rods adjoined to each other in some known manner such as by welding. Stanchion members 34 form the side supports for carriage 26. Interconnecting stanchion members 34 are a plurality of cross frame members 36. Cross frame members 36 extend transverse to lower frame members 16 and are located so as to pass above log 12 during the reciprocable movement of carriage 26 along guide rails 16. In addition, several upper cross frame members 38 extend across carriage 28 adjacent the uppermost ends of the opposed stanchion members 34 in order to further interconnect stanchion members 34, provide stability for carriage 26, and serve as platforms for structural elements hereinafter further described.

Illustrated in FIGS. 1 through 9 is a pair of band saws 40 for cutting logs 12 by continuous back and forth passes across log 12. Each band saw 40 is mounted to stanchion members 34 by band saw frame 42, and each band saw frame 42 includes tubular portions 44 that ride upon selected stanchion members 34 in order to facilitate the raising and lowering of band saws 40. Each band saw 40 has teeth on only one side of the blade; and band saws 40 can be mounted on band saw wheels 46 so that the teeth of band saws 40 can face inward toward each other or outward away from each other. The preferred manner of mounting band saws 40 is to have the teeth of each band saw 40 face inward toward each other. As will be more fully described hereinafter, band saws 40 are capable of being raised and lowered simultaneously as a unit concomitant with the simultaneous raising and lowering of each band saw frame 42. Each band saw 40 is also capable of selective incremental adjustment to obtain the desired depth or level cut lengthwise through log 12.

As shown in FIGS. 1 through 9, the means to raise and lower each band saw frame 42 and adjoined band saw 40 simultaneously as a unit includes numerous cooperating elements. The band saw raising and lowering means includes a pair of guides 48 with each guide 48 mounted on a respective stanchion member 34 (generally the central stanchion member) for slidable upward and downward movement thereon. A band saw adjustment bar or lift bar 50 is pivotally mounted on each guide 48 with the pivot point of each bar 50 being at the center of the respective lift bars 50 where they mount to guides 48. Each lift bar 50 is further defined by opposed distal ends 52, and pivotally secured to each distal end 52 is A link arm 54 so that each lift bar 50 has one link arm 54 connected to each distal end 52. The lowermost ends of link arms 54 are in turn pivotally connected to the respective band saw frames 42.

As illustrated in FIGS. 1 through 9, in order to raise and lower both band saw frames 42 and band saws 40 platform 56 is supported on upper cross frame members 38, and disposed on platform 56 are two lift motors 58 (12 volt motors with one for raising and one for lowering), gearbox 60 interconnected to lift motors 58, and lift shaft 62 drivingly interconnected to lift motors 58 through gear box 60. In addition, one lift pulley 64 is drivingly interconnected to lift motors 58 and gearbox 60. Projecting axially from gearbox 60 is lift shaft 62 for selective rotational motion to raise or lower band saws 40 and band saw frames 42. The distal end of lift shaft 62 is supported on the uppermost portions of stanchion members 34 by lift shaft mounting bracket 66. Mounted to lift shaft 62 is a pair of lift shaft sprockets 68 that rotate coincident with lift shaft 62. Passing about each lift sprocket 68 is a cord, link or chain 70. Each chain 70 has a lower chain end attached to each guide 48 so that rotation of lift shaft 62 in one direction causes chains 70 to be wound about the respective lift sprocket 68 thereby pulling guides 48 upward and, as a result, raising both band saw frames 42 and band saws 40 interconnected to the respective band saw frames 42. Rotation of lift shaft 62 in the opposite direction causes chains 70 to unwind on sprockets 68 thereby causing guides 48 to slide downward and, as a result, lowering both band saw frames 42 and band saws 40 on stanchion members 34. During the initial positioning of band saws 40 relative to log 12 and before the cutting operation, both band saws 40 may need to be raised above log 12 and then both before and after each cutting pass by carriage 26, band saws 40 will need to be further adjusted to bring each band saw 40, in turn, adjacent to log 12 for the subsequent fine adjustment prior to that particular pass.

In addition to the means for raising and lowering both band saw frames 42 and band saws 40 as a unit, bi-directional band mill 14 of the present invention also includes a means for achieving a selective incremental adjustment of each band saw 40 prior to cutting a section from log 12. It should be noted that the means for obtaining selective incremental adjustment of each band saw 40 operates independently of the means for raising and lowering band saw frames 42 and band saws 40. Thus, the selective incremental adjustment means includes a pair of rack bars 72 interconnected to only one band saw frame 42 for providing selective upward and downward movement of each band saw frame 42 and band saw 40 cooperating together as unitary feature. Rack bars 72 are located inboard of one band saw 40 and adjacent to opposed stanchion members 34. Because band saw frames 42 are interconnected to each other through link arms 54 and link or adjustment bars 50, rack bars 72 only need to be interconnected to one band saw frame 42 as the movement (upward or downward) for incremental adjustment of one band saw frame 42 is perforce transferred (for movement in the opposite direction) to the other band saw frame 42 and band saw 40.

As shown in FIGS. 1 through 9, the means for selective incremental adjustment of each band saw 40 also includes an integral crank and drive sprocket unit whereby crank 74 is manually operable to rotate a pair of adjacent and coaxially mounted drive sprockets 76. Meshed with each rack bar 72 is a pinion 78, and pinions 78 are drivingly interconnected to one drive sprocket 76 by an endless linked chain 80. Chain 80 is mounted to that drive sprocket 76 and a first sprocket 82, and first sprocket 82 is coaxially mounted on pinion shaft 83 with both pinions 78. The other drive sprocket 76 is drivingly interconnected to a second sprocket 84 by a second linked chain 86. Thus, it can be seen that manual rotation of crank 74 transfers rotational motion to drive sprockets 76 and endless linked chains 80 and 86 that in turn causes rotation of pinions 78 on drive shaft 83. Manual rotation of crank 74 in one direction raises one band saw frame 42 and band saw 40 unit while lowering the opposite band saw frame 42 and band saw 40 unit; and rotation of crank 74 in the opposite direction reverses the raising and lowering movements. Because both band saw frames 42 and band saws 40 are pivotally interconnected by lift bars 50, rack bars 72 only need to engage one band saw frame 42 as up or down movement is transferred to the other band saw frame 42 and band saw 40 through the pivotal motion of both lift bars 50. Incremental adjustment of each band saw frame 42 and band saw 40 is necessary after each complete lengthwise pass across log 12 by carriage 26 so that for the next pass by carriage 26 in the reverse or return direction, that particular band saw 40 is located at the appropriate level or depth to cut the next section from log 12.

As shown in FIGS. 1 through 4, band mill unit 14 includes a saw drive motor 88 having a main drive belt 90 mounted on a main drive pulley 92. In addition, two pairs of band saw pulleys 94 are used with one pair of band saw pulleys 94 associated with and driving each band saw 40. Each pair of band saw pulleys 94 is drivingly interconnected by respective band saw pulley belts 96. Furthermore, one band saw pulley 94 from each pair is coaxially mounted with main drive pulley 92 on main drive shaft 98.

Figure 4:
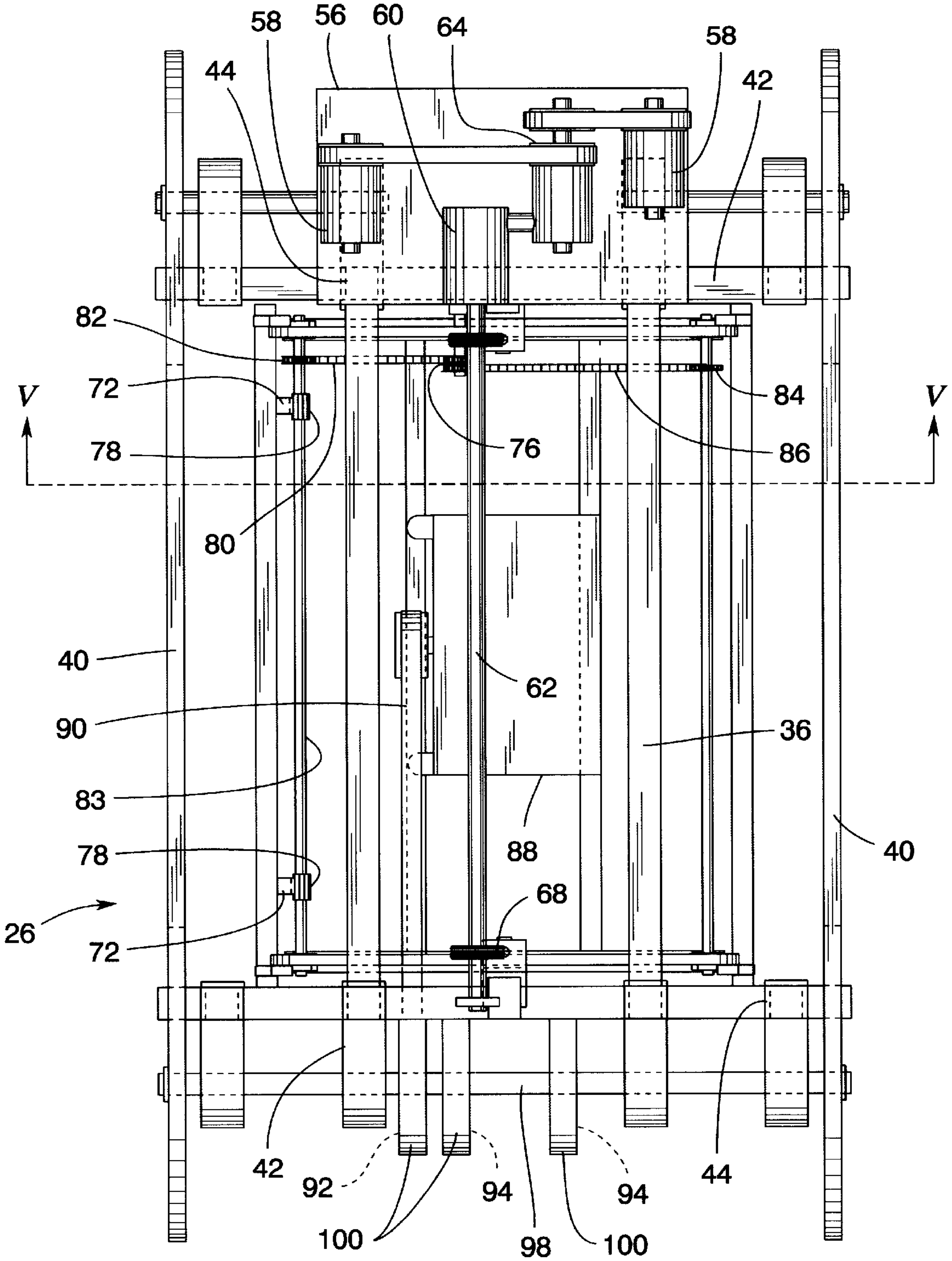
FIG. 4 is a top plan view of the bi-directional cutting band mill unit first shown in FIG. 1.
Figure 5:
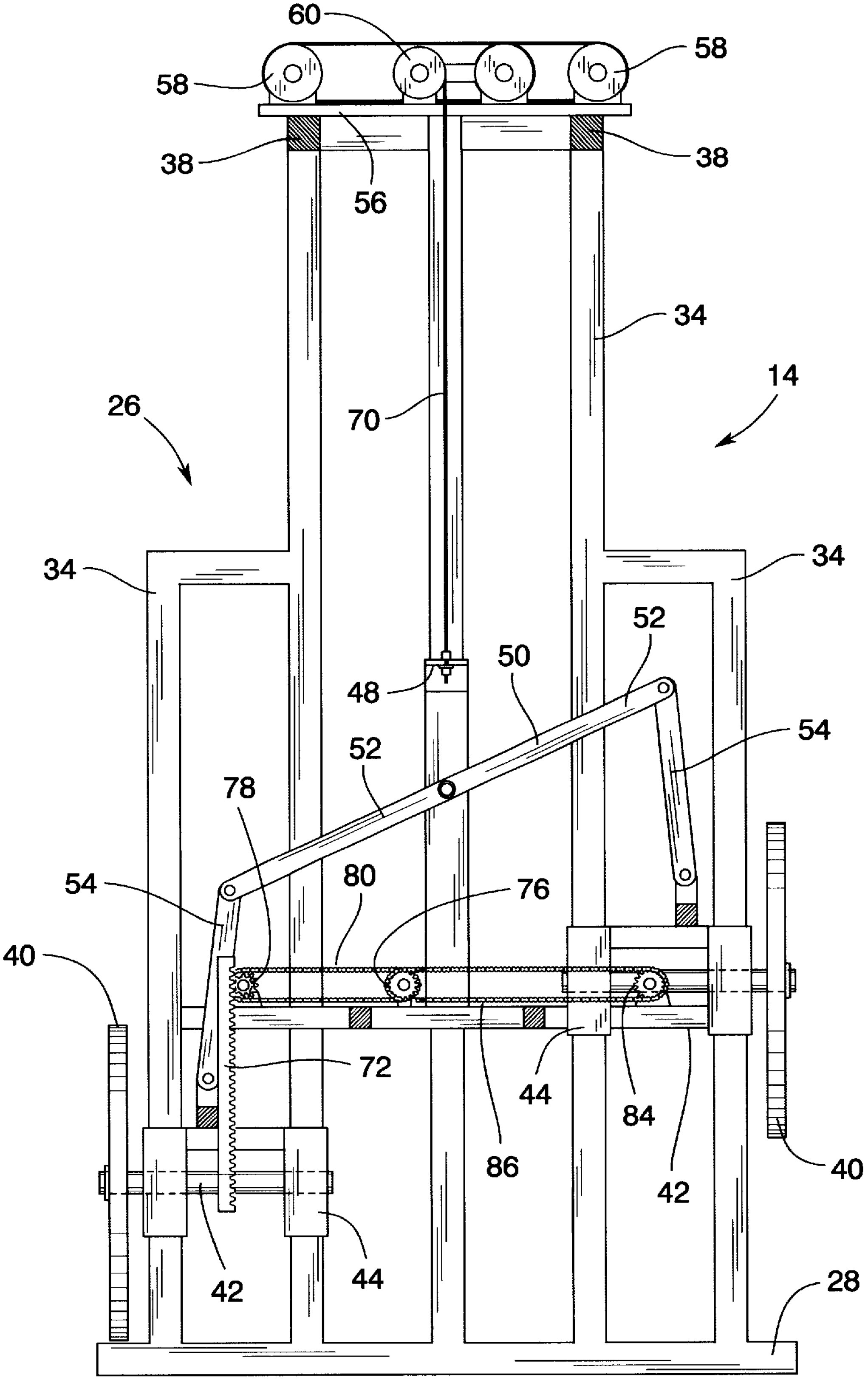
FIG. 5 is a sectioned elevational of the bi-directional cutting band mill unit taken along lines V—V of FIG. 4 illustrating one band saw frame and band saw in the raised disposition and the other band saw frame and band saw in the lowered disposition.
Figure 6:
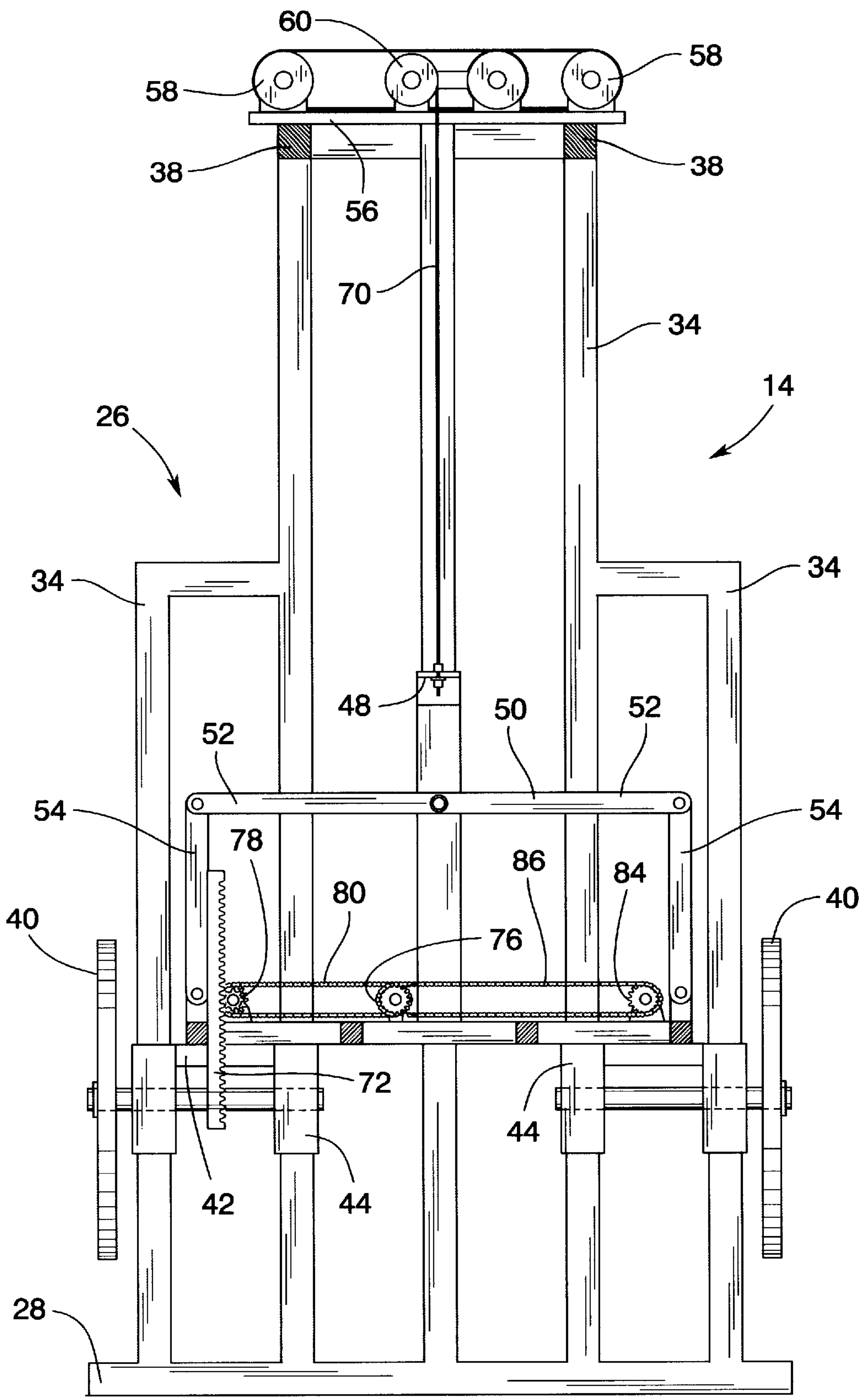
FIG. 6 is a sectioned elevational view of the bi-directional cutting band mill unit taken along lines V—V of FIG. 4 illustrating the disposition of the band saw frames and band saws level with each other in the raised disposition.
Figure 7:
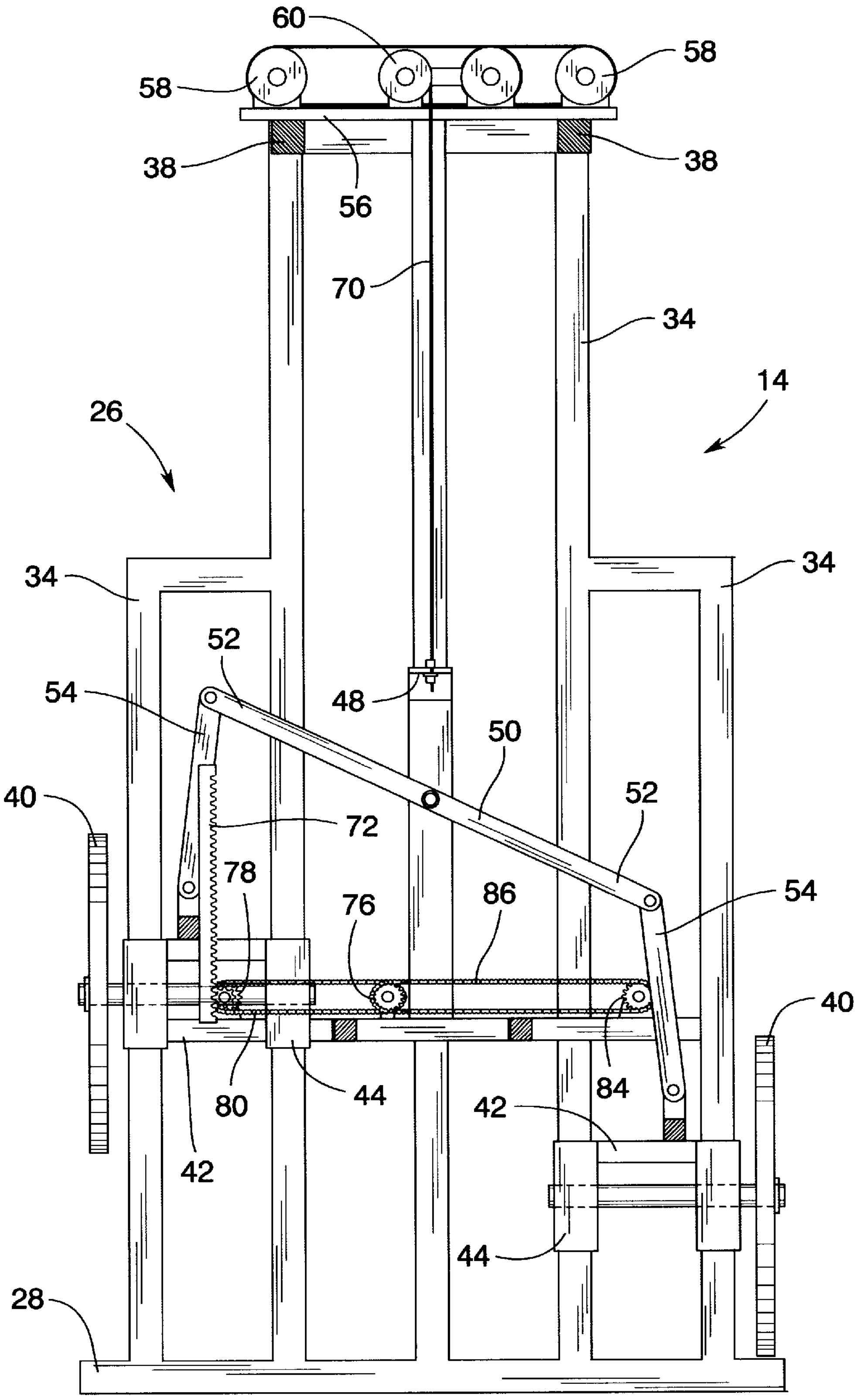
FIG. 7 is a sectioned elevational view of the bi-directional cutting band mill unit taken along lines V—V of FIG. 4 illustrating the disposition of the band saw frames and band saws opposite of their disposition illustrated in FIG. 5.
Figure 8:
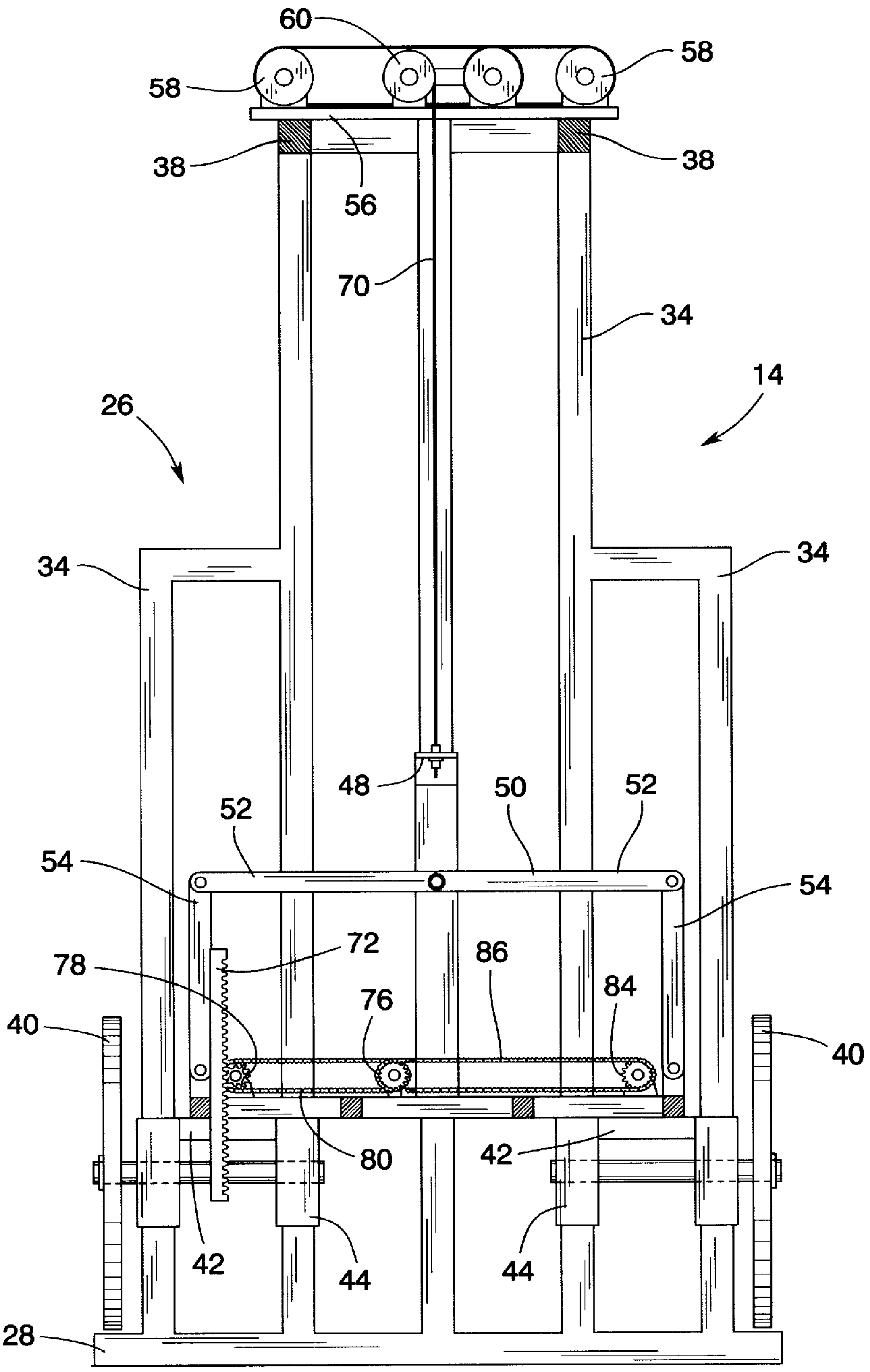
FIG. 8 is a sectioned elevational view of the bi-directional cutting band mill unit taken along lines V—V of FIG. 4 illustrating the disposition of the band saw frames and band saws level with each other and in the lowered disposition.

Illustrated in FIGS. 2 through 4 are belt guards 100 for each pair of band saw pulleys 94 and main drive pulley 92. Guards 100 serve as substantially enclosed protective pockets for band saw pulleys 94 and belts 96 as the belts travel on the respective pulleys 94. Furthermore, each pair of guards 100 serves as guides for pulley belts 96 so that when each band saw frame 42 and band saw 40 is lifted or raised up to the non-driving position, belt 96 disengages from band saw pulley 96. When that respective band saw frame 42 and band saw 40 are lowered to the driving position, guards 100 maintain the alignment of pulley belt 96 and guide pulley belt 96 back on to pulleys 94 thereby reseating within belt 96 on that respective set of band saw pulleys 94.

The foregoing description discloses and describes a preferred embodiment for the invention, and those skilled in the art will understand that other variations and modifications may be possible and practicable, and still come within the ambit of the invention.

I claim:

1. Apparatus for cutting logs in successive bi-directional passes, comprising:

a lower frame for placement on the ground surface and upon which the log to be cut is positioned;

a carriage disposed on the lower frame and capable of reciprocable movement thereon for making successive back and forth passes across the log;

a pair of spaced-apart endless saw blades mounted on the carriage with the teeth of both saw blades facing inwardly toward each other so that as the carriage travels across the log in one pass a horizontal section from the log is cut by one saw blade and as the carriage reciprocates on the lower frame in the opposite direction for the next pass another horizontal section is cut from the log by the other saw blade;

means for raising and lowering both saw blades as a unit so that both saw blades can be raised above the log and lowered adjacent to the log for positioning in turn each saw blade for cutting a horizontal section from the log in that respective pass; and, means for selective incremental adjustment of the saw blades in order to position each saw blade at the proper depth for making a horizontal sectional cut from the log.

2. The apparatus recited in claim 1 wherein the carriage includes a pair of spaced-apart, longitudinally extending lower carriage members that ride upon the lower frame as the carriage reciprocates thereon for cutting the log.

3. The apparatus recited in claim 2 wherein the carriage includes a plurality of stanchion members joined to and extending upwardly from each lower carriage member.

4. The apparatus recited in claim 3 further comprising a pair of guides with each guide mounted on one stanchion member for slidable, reciprocable movement thereon.

5. The apparatus recited in claim 4 further comprising a pair of saw blade adjustment bars with each saw blade adjustment bar pivotably mounted to each guide and the adjustment bars having opposed distal bar ends that are pivotably interconnected to the saw blades.

6. The apparatus recited in claim 5 wherein the means for selective incremental adjustment for both saw blades includes one pair of rack bars interconnected to the distal bar ends of at least one saw blade adjustment bar and the rack bars capable of selective reciprocable movement for adjusting and fixing the cutting position of each respective saw blade.

7. The apparatus recited in claim 6 further comprising a pair of pinions with each pinion engaging each rack bar so that the clockwise rotation of both pinions results in the downward movement of one rack bar and the concomitant upward movement of the other rack bar and the counterclockwise rotation of both pinions reverses the direction of movement of the rack bars.

8. The apparatus recited in claim 7 further comprising an integral crank and sprocket member drivingly interconnected to the pinions so that rotation of the crank and sprocket member transmits rotational motion to the pinions thereby causing the upward and downward movements of the rack bars for adjusting the saw blades.

9. The apparatus recited in claim 8 further comprising a drive chain mounted on the pinions and the crank and sprocket member so that the rotation of the crank and sprocket member transmits rotational motion to the pinions through the drive chain causing the pinions to rotate thereby raising one rack bar and saw blade interconnected thereto and lowering the other rack bar interconnected to the other saw blade in order to achieve the incremental adjustment and positioning of one saw blade for cutting the log and the positioning of the other saw blade for passing above the log.

10. Apparatus for cutting horizontal sections from a log by successive back and forth passes across the log, comprising:

- a pair of guide rails for supporting the log and between which the log is positioned for cutting;
- a framework supported on the guide rails and capable of reciprocable movement thereon in order to facilitate log cutting by making successive passes across the length of the log;
- a pair of spaced-apart saw blades mounted on the framework with the teeth of each saw blade facing away from each other so that as the framework passes across the log during one pass a horizontal section is cut from the log by one saw blade and when the framework reverses direction for the next pass another horizontal section is cut from the log by the other saw blade;
- means for raising and lowering both saw blades as a single unit so that both saw blades can be lifted above the log and lowered adjacent to the log in preparation for cutting the log; and
- means for selective incremental adjustment of each saw blade for positioning each respective saw blade at the desired depth prior to that saw blade cutting off a horizontal section from the log.

11. The apparatus recited in claim 10 further comprising a pair of spaced-apart guides mounted on the framework and capable of reciprocable upward and downward movement thereon for the coincident raising and lowering of both saw blades.

12. The apparatus recited in claim 11 further comprising a lift motor mounted on the framework and above the guides.

13. The apparatus recited in claim 12 further comprising a lift shaft interconnected to the lift motor and driven therefrom.

14. The apparatus recited in claim 13 further comprising a pair of saw blade lift chains mounted on the lift shaft with each saw blade lift chain having a first chain end attached to the lift shaft and a second chain end attached to each respective guide so that selective rotation of the lift shaft winds and unwinds the lift chains thereby simultaneously raising and lowering both guides and the saw blades that are interconnected to the guides.

15. Apparatus for cutting consecutive horizontal sections from a log by reciprocable passes across the log, comprising:

- a lower frame for placement on the ground surface and including a pair of elongated spaced-apart carriage support members on which the log to be cut is positioned;
- a carriage mounted on the carriage support members for linear reciprocable movement thereon across and over the log;
- a pair of endless saw blades mounted in spaced relation on the carriage with the teeth of each saw blade facing inwardly toward each other so that the movement of the carriage across the log in one pass causes one saw blade to cut off a horizontal section from the log and as the carriage reciprocates on the lower frame for a return pass the other saw blade cuts off another horizontal section from the log;
- means for raising and lowering both saw blades together so that both saw blades can be lifted above the log and then lowered adjacent to the log in preparation for cutting off horizontal sections from the log; and
- means for selective incremental adjustment of each saw blade in order to position in turn each saw blade at the appropriate depth for making a horizontal cut on the log.

16. The apparatus recited in claim 15 further comprising a pair of spaced-apart guides mounted on the framework for slidable reciprocable movement thereon for coincident raising and lowering of both saw blades.

17. The apparatus recited in claim 16 further comprising a lift motor mounted on the framework and above the guides.

18. The apparatus recited in claim 17 further comprising a lift shaft interconnected to the lift motor and rotatably driven therefrom.

19. The apparatus recited in claim 18 further comprising a pair of saw blade lift chains mounted on the lift shaft with each saw blade lift chain having a first chain end attached to the lift shaft and a second chain end attached to each respective guide whereupon selective rotation of the lift shaft will wind and unwind the lift chains for either simultaneously raising and lowering both guides and the saw blades interconnected thereto.

20. The apparatus recited in claim 19 wherein the cooperating interaction of the lift chains and the guides selectively raises both saw blades above the log and lowers both saw blades adjacent to the log for further incremental adjustment in turn of each saw blade for successively cutting horizontal sections from the log.

21. Apparatus for cutting horizontal sections from a log by successive reciprocable passes across the length of the log, comprising:

- a trailer having a pair of spaced-apart side rails and on which the log is positioned for cutting;
- a carriage mounted on the side rails of the trailer and capable of reciprocable movement thereupon for making successive bi-directional passes across the log;

a pair of saw blades mounted in spaced relationship on the carriage and independently operable with the teeth of each saw blade facing inwardly toward each other so that movement across the log by the carriage during one pass causes one saw blade to cut off a horizontal section from the log and as the carriage reverses direction for a return pass the other saw blade cuts off a succeeding horizontal section from the log;

means for raising and lowering both saw blades as a single unit so that both saw blades can be lifted above the log and then lowered adjacent to the log for positioning at the desired depth for cutting a horizontal section from the log by that respective saw blade; and means for selective incremental adjustment of the saw blades so that each saw blade can be positioned adjacent to and at either end of the log for making a horizontal sectional cut on the log for that respective pass.

* * * * *